Oct. 21, 1952 C. CLOS 2,614,632

APPARATUS FOR RECORDING NUMERALS IN CODE

Filed July 27, 1948 4 Sheets-Sheet 1

INVENTOR
C. CLOS
BY

ATTORNEY

Oct. 21, 1952 C. CLOS 2,614,632

APPARATUS FOR RECORDING NUMERALS IN CODE

Filed July 27, 1948 4 Sheets-Sheet 2

INVENTOR
C. CLOS
BY
H. A. Patterson
ATTORNEY

INVENTOR
C. CLOS
BY H. A. Patterson
ATTORNEY

APPARATUS FOR RECORDING NUMERALS IN CODE

Filed July 27, 1948 4 Sheets-Sheet 4

| 0 | 1 | 2 | 4 | 7 | ADDITIONAL SYMBOL RECORDED IN TAPE |
|---|---|---|---|---|---|
| 2/5<br>4,7 | 2/5<br>0,1 | 3/5<br>1,4,7 | 3/5<br>1,2,7 | 2/5<br>0,7 | 6 |
| 2/5<br>4,7 | 3/5<br>2,4,7 | 2/5<br>0,2 | 2/5<br>0,4 | 3/5<br>1,2,4 | 8 |

| DIGITS RECORDED IN COLUMNS 1 TO 5 | SUPPLEMENTARY DIGIT |
|---|---|
| 01247 | 6 |
| 01247 | 8 |
| 00000 | 0 |
| 00000 | 1 |
| 10000 | 0 |
| 11111 | 0 |
| 12345 | 0 |
| 12345 | 1 |
| 12345 | 2 |
| 12345 | 3 |
| 12345 | 8 |
| 66666 | 2 |
| 99999 | 1 |
| 99999 | 6 |
| 76912 | 0 |
| 76912 | 4 |
| 76912 | 6 |
| | |

INVENTOR
C. CLOS
BY William F. Simpson.
ATTORNEY

Patented Oct. 21, 1952 2,614,632

UNITED STATES PATENT OFFICE 2,614,632

APPARATUS FOR RECORDING NUMERALS IN CODE

Charles Clos, Middle Village, N. Y., assignor to American Telephone and Telegraph Company, a corporation of New York Application July 27, 1948, Serial No. 40,939

2 Claims. (Cl. 164—113)

This invention relates to recording and storing information by punching or embossing tapes or other similar web-like materials, or by magnetically recording and storing information magnetically in magnetic tapes or other similar tapes, wires or sheets.

An object of the invention is to provide improved methods, apparatus and circuits to increase the amount of information which may be readily stored in and later obtained from a given space on such tape web-like materials or magnetic materials.

A feature of this invention relates to recording information in or on a tape or web-like material by means of any one of a plurality of different codes and selecting one of the codes in accordance with additional information to be recorded in said tape.

In one exemplary embodiment of the invention set forth hereinafter, the tape recording and sensing equipment is designed for use in dial telephone systems.

It is to be understood, however, that the invention is not limited to this exemplary embodiment, nor is it limited to dial telephone switching systems, but may find use wherever it is desired to store information for future use.

A further object of this invention is to more readily and more economically record additional information on tapes now employed for recording information and at the same time to check the recorded information to insure that the recordings are in proper form and actually represent information in accordance with the selected codes.

In certain dial telephone switching systems, in certain telegraph systems and in certain computing and accounting systems, it is frequently desirable to store numerical or other information in the form of perforated or embossed tapes or in the form of magnetic wires or tapes which have the property of retaining magnetic conditions impressed upon them.

In many of said types of systems the information is recorded in the form of either one or two different conditions, in a plurality of different positions on the tape in accordance with a predetermined code. For example, where the recording is on a paper tape, the tape is divided into a plurality of elemental areas and punch or embossed marks made in certain of the elemental areas and not in other elemental areas. Likewise, for magnetic recording either one or two magnetic conditions may be recorded in the wire or tape in each one or plurality of preassigned locations or positions. In the usual case, each digit, character, symbol, letter of alphabet or other elementary piece of information is assigned a code group of such spaces usually of a fixed or predetermined number and usually arranged in a row or pattern across the tape. For example, in recording the magnitude of the digits of the decimal number system as set forth herein in an exemplary embodiment of this invention, five positions of the tape are used to record a digit, with the tape punched or embossed in any two of these five positions to represent the magnitude of the digit to be recorded in accordance with one code. Such representation of the magnitude of the digit of the decimal system of numbers is understood in the prior art.

The magnitude of the digits of the decimal number system may also be stored in five unit areas in which punch marks or emboss marks are made in any three of the five areas, in accordance with any suitable code. Such arrangements are also known in the prior art.

Thus it is possible to store or record the magnitude of any digit from 0 to 9, by means of two different codes in each area assigned to a digit, which area frequently comprises five recording spaces in the recording medium.

In accordance with the present invention, the particular one of these two codes employed to record the magnitude of the digit in the position assigned to it, is selected by additional information to be recorded in the same area or position on the tape, and the recording of such additional information does not in any way interfere with the recording of the magnitude of the digits normally recorded in said area.

Another object of this invention is to provide methods, apparatus and circuits to recover from the tape both the magnitude of the digit recorded in the area in accordance with any one of a plurality of different codes and also the additional information recorded in said area by the selected one of said codes.

A further extension of this invention relates to perforating a wide tape of the type employed for automatic message accounting in telephone systems. In such tapes, twenty-eight (28) areas for recording punches or emboss marks are provided in each transverse line or pattern across the tape. These areas are divided up into five sets of five elemental areas with three auxiliary areas for recording certain other information. These five digits may be recorded in each transverse line or pattern of punches or emboss marks across the tape. These digits are recorded by means of codes in which either two or three emboss marks or punches are made in each of the groups of five areas. The particular code employed in each of the areas may be selected by means of additional information. This additional information may take the form of an additional digit since five different areas are provided in each transverse section and the code in each of the five areas may be selected by means of two different conditions, thus providing means for recording the magnitude of a sixth digit.

The above-described codes wherein either two or three emboss marks or punches are recorded in each of the areas assigned to a digit permits the checking of the perforation of the tapes and the operation of the sensing equipment controlled by them to insure proper operation of the equipment. If only one mark or more than three marks appear in any area assigned to a digit, the equipment will recognize this fact and stop and indicate a trouble condition or operate in any other desired manner.

Also in accordance with this invention, the additional information or the additional digit may be similarly checked. If, for example, more or less than two of the five areas in any transverse position across the table have more than two emboss marks or punches therein, a trouble condition may be indicated.

The foregoing and other objects and features of the invention may be more readily understood from the following description of an exemplary embodiment thereof and with reference to the attached drawings in which.

Figure 1:
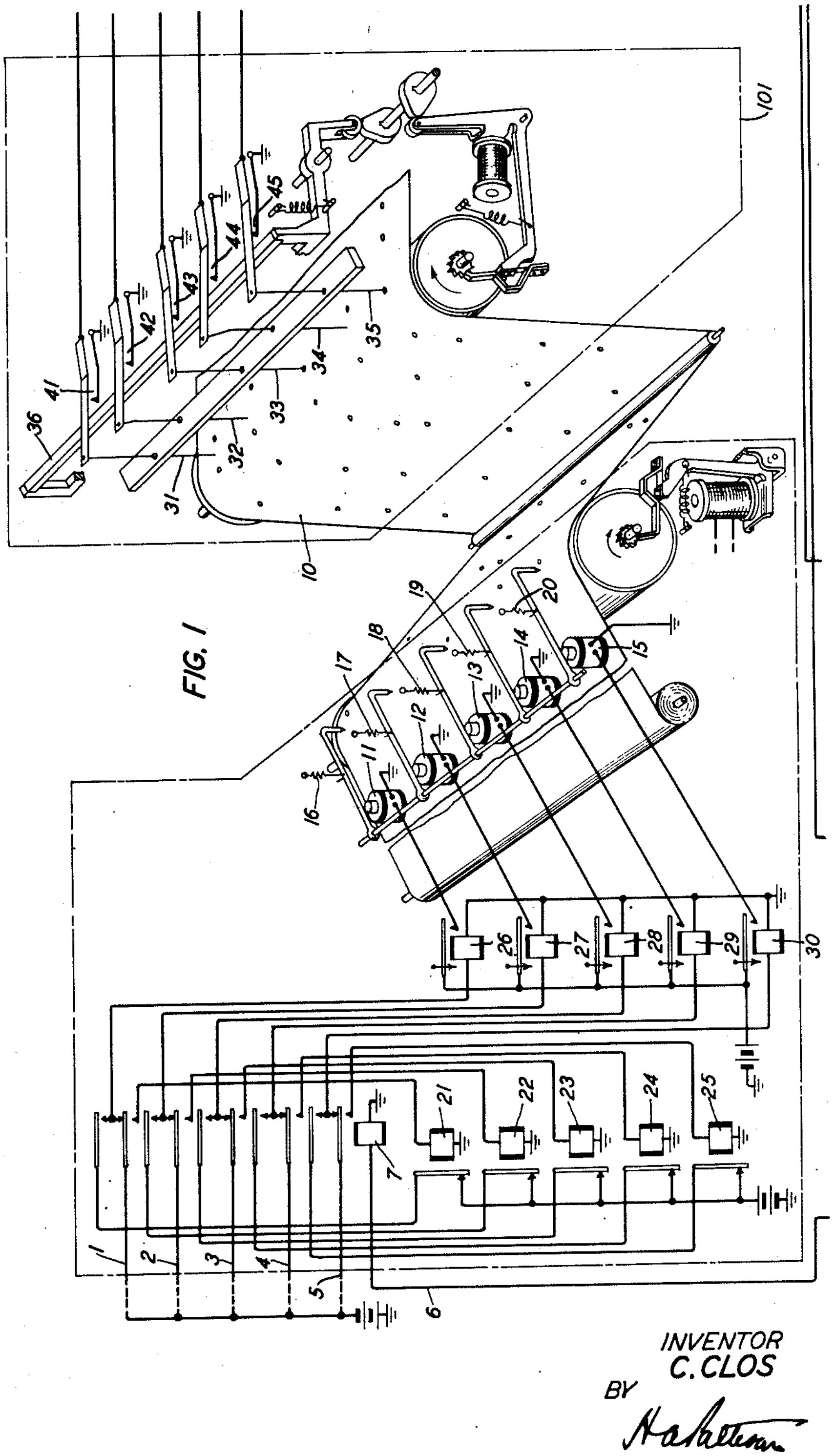
Figure 1 shows a suitable manner of recording the information on the tape and reading the information in storing the tape.

Referring now to Fig. 1 the five leads 1 to 5, shown in the upper left corner are assumed to have battery applied to any two of these five leads. The exact manner in which the battery is applied to these leads is not shown in Fig. 1. This battery may be applied by means of manually-operated keys or by register relays in a telephone switching system, which registers the number of a called party or these leads may be closed to battery in another suitable manner. It is understood, however, that battery is applied to only two of the five leads at any particular time. The battery applied to, say, leads 1 and 2 causes the slow operating relays 26 and 27 to operate which relays in turn cause magnets 11 and 12 to be operated. These magnets in operating overcome the restoring force of springs 16 and 17 and attract their armatures and cause holes to be punched in the paper tape or web 10.

At the completion of the perforation of these holes and removal of battery from leads 1 and 2, relays 26 and 27 will release and release magnets 11 and 12. The springs 16 and 17 will then restore the armatures of these magnets to their unoperated positions and then tape 10 will be advanced, by means not shown but in a well understood manner, to present a new area for the recording of the next digit. Inasmuch as mechanisms advancing tapes under these circumstances are well known in the prior art such a mechanism has not been shown in the drawing. It is understood, however, that a suitable mechanism of this type is provided for properly advancing the tape to present new areas for the recording of each of the digits and for such other information as may be desired. For a more detailed description of suitable recording apparatus reference is made to United States patent applications of Carpenter Serial No. 666,280, filed May 1, 1946, Carpenter-Collis, Serial No. 759,402, filed July 7, 1947, and Mallina, Serial No. 635,355, filed December 15, 1945, which issued as Patent 2,576,844 on November 27, 1951, all of which applications are hereby made a part hereof to the same extent as if fully set forth herein.

A sixth lead is also provided which may be connected to battery when it is desired to record additional information in tape 10. Battery is applied to lead 6 in the same manner as applied to leads 1 to 5 or in any other suitable manner. The battery is applied substantially simultaneously to any two of the leads 1 to 5 and to lead 6, when battery is applied to this lead. Relay 7 operates in response to the application of battery to lead 6 and transfers the leads 1 to 5 from the slow relays 26 to 30 to relays 21 to 25, inclusive. Thus, upon the application of battery to lead 6 and to two of the leads 1 to 5 in the manner described above, two of the relays 21 to 25, inclusive, are operated, instead of two of the relays 26 to 30.

Also upon the operation of relay 7 the circuit of each of the relays 26 to 30 is prepared from ground through the windings of respective relays 26 to 30 and operated contacts of relay 7 to battery through the break contacts of relays 21 to 25, inclusive. However, the operation of two of the relays 21 to 25, inclusive, interrupts the circuits through the corresponding relays 26 to 30 so that under these circumstances two of the relays 26 to 30 will not operate and three will operate. Relays 26 to 30 are slow operate relays in order to permit relay 7 and two of the relays 21 to 25 to have time to operate before the punch magnets 11 to 15 operate when battery is applied substantially simultaneously to the selected leads. The three relays 26 to 30 which eventually operate cause three punch magnets 11 to 15 to operate and thus cause three perforations in the tape, instead of two under the conditions described hereinbefore.

The release of the circuits is similar to that described hereinbefore.

When it is desirable to record a two out of five code again, battery is not applied to lead 6 by the controlling equipment with the result that relay 7 does not operate so only two of the magnets 11 to 15 operate. Thus the recording of the desired information in the tape may be continued digit by digit in the manner described above.

As pointed out above the information and the equipment for controlling the recording of the information in the tape may be an automatic telephone switching system which operates in a known manner so that a detailed description thereof may not be repeated herein.

After the information has been recorded in web or tape 10 the tape may be cut or otherwise removed from the punching mechanism and stored in any suitable manner for later controlling counting, switching or other types of cuits, or the tape may go directly through the reading and sensing equipment so that the information stored on the tape will be sensed and taken off with a shorter delay. The control circuits for advancing the tape through a storage device or to the tape sensing equipment are operated in a well understood and conventional manner so that these circuits need not be repeated here. The perforated tape then passes under the sensing fingers or pins 31 to 35. The mechanism and control circuits for advancing the tape at this time has not been disclosed or described herein because such circuits and equipment are well known and understood in the prior art. When it is desired to read the information off of the tape the contact lever bail 36 is rotated in a counter-clockwise direction as shown in Fig. 1 and permits the sensing fingers or pins 31 to 35 to contact the tape and sense the punch position or positions in the tape. If perforation or indentation appears under any one of these pins, the pin will actuate the corresponding contacts 41 to 45. As shown in the drawing pins 33 and 35 are over punch marks or indentations in the paper tape. Consequently contacts 43 and 45 are closed when bail 36 rotates in a counter-clockwise direction as shown in the drawing.

Figure 2:
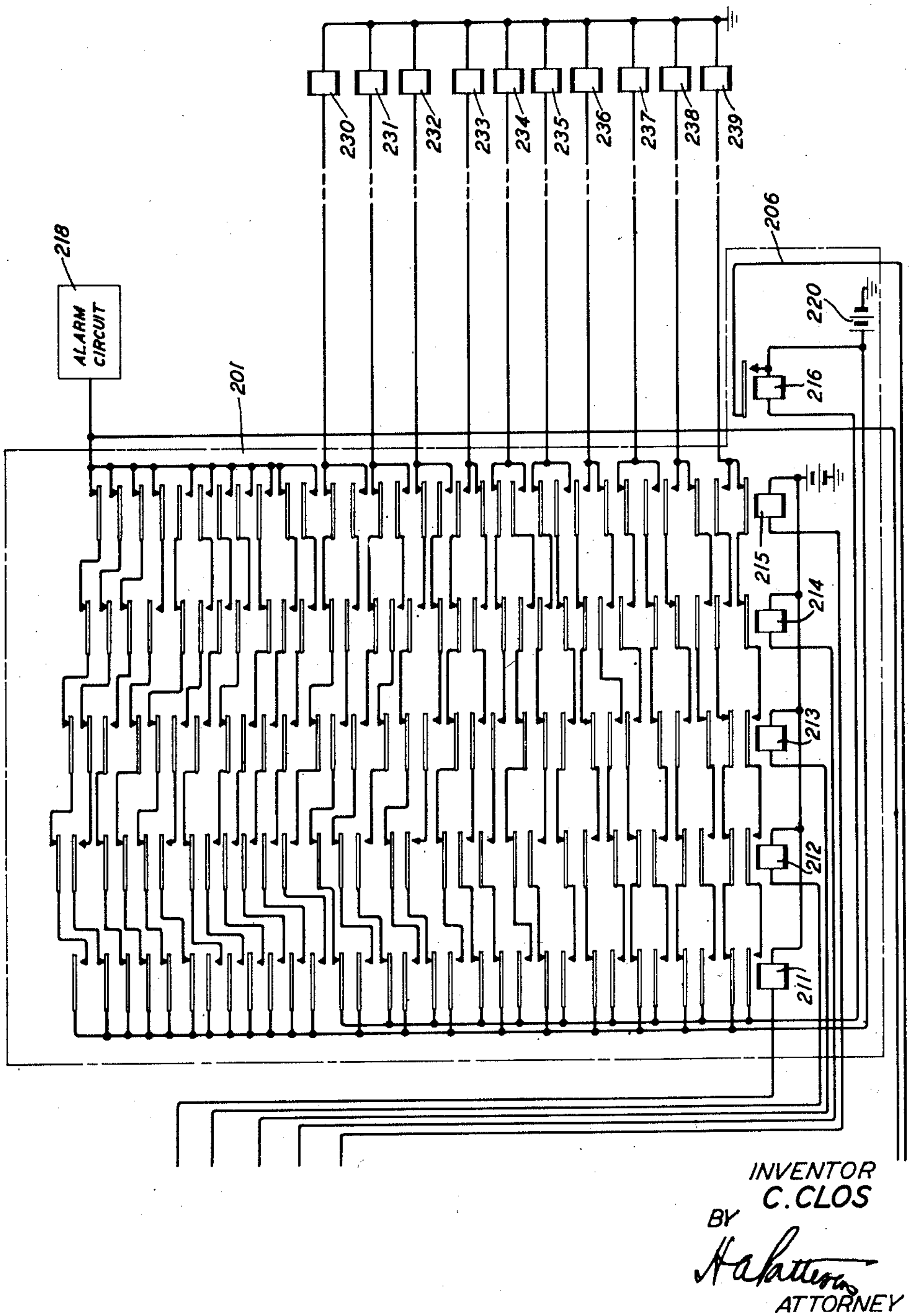
Fig. 2 shows a suitable circuit for properly responding to the perforations in the tape and translating them to recover the information originally recorded and stored in the tape.

At the termination of the reading of this row of perforations in the tape the lever bail 36 will be rotated in a clockwise direction which causes the sensing fingers to be retracted and the tape advanced to the next row of perforation therein, whereupon the above-identified described operation of sensing the start perforations in the tape is repeated. The sensing contacts 41 to 45, inclusive, control five relays 211 to 215. Each of these relays as shown in Fig. 2 provide a large plurality of contacts and armatures which in the exemplary embodiment set forth herein is 31. It is to be understood that a greater or lesser number may be employed when it is so desired. For normal operation wherein there are only two perforations, in a transverse line or pattern two of the relays 211 to 215 will be operated and cause the circuit to be completed through the decoding arrangement shown in Fig. 2 from battery 220 through the contacts of relays 211, 212, 213, 214 and 215 to one of the magnets 230 to 239. As shown on the drawing none of these paths are completed because all of the relays 211 to 215 are shown in a normal or unoperated condition. However, upon the operation of any two of these relays such as 213 and 215, for example, a circuit will be completed from battery through the armatures of the contacts of relays 211, 212, 213, 214 and 215 to magnet 238. On the other hand, if any three of these relays are operated in response to the additional information perforated in the tape wherein the code combination was inverted, battery through the windings of relay 216 is connected to the corresponding magnet 230 through 239. It should be noted that twenty of the output paths from the contacts of relays 211 through 215 are brought together in pairs to form 10 output leads which extend to the windings of magnets 230 to 239, inclusive. If it is so desired, each of the twenty paths may be brought out to individual conductors and applied to control any desired types of circuit or equipment. In addition, the operation of relay 216 at this time indicates that the code is the complement of the usual code and thus intended to represent some additional information in accordance with the present invention.

It is thus apparent that the same information may be stored in a given set of perforations in accordance with either of two different codes which in the exemplary embodiment set forth herein are referred to as either two out of five code or three out of five code, and that additional information may be recorded by controlling the particular code employed in accordance with the additional information. It is also to be noted that in the exemplary arrangements disclosed herein the two different codes are complementary, i. e., a given signaling condition in one position in one code becomes the opposite signaling condition in the same position in the other code.

If only one or more than three of the relays are operated in response to the closure of only one or more than three of the contacts 41 to 45 in response to the perforations or emboss marks in any transverse row or pattern across the tape, no circuit is closed to any of the signal responsive devices 230 through 239. Instead a circuit will be completed from battery through the armatures and contacts or relays 211 through 215 to the alarm circuit 218 thus indicating an improper set of perforations in the tape or some trouble conditions.

Figure 3:
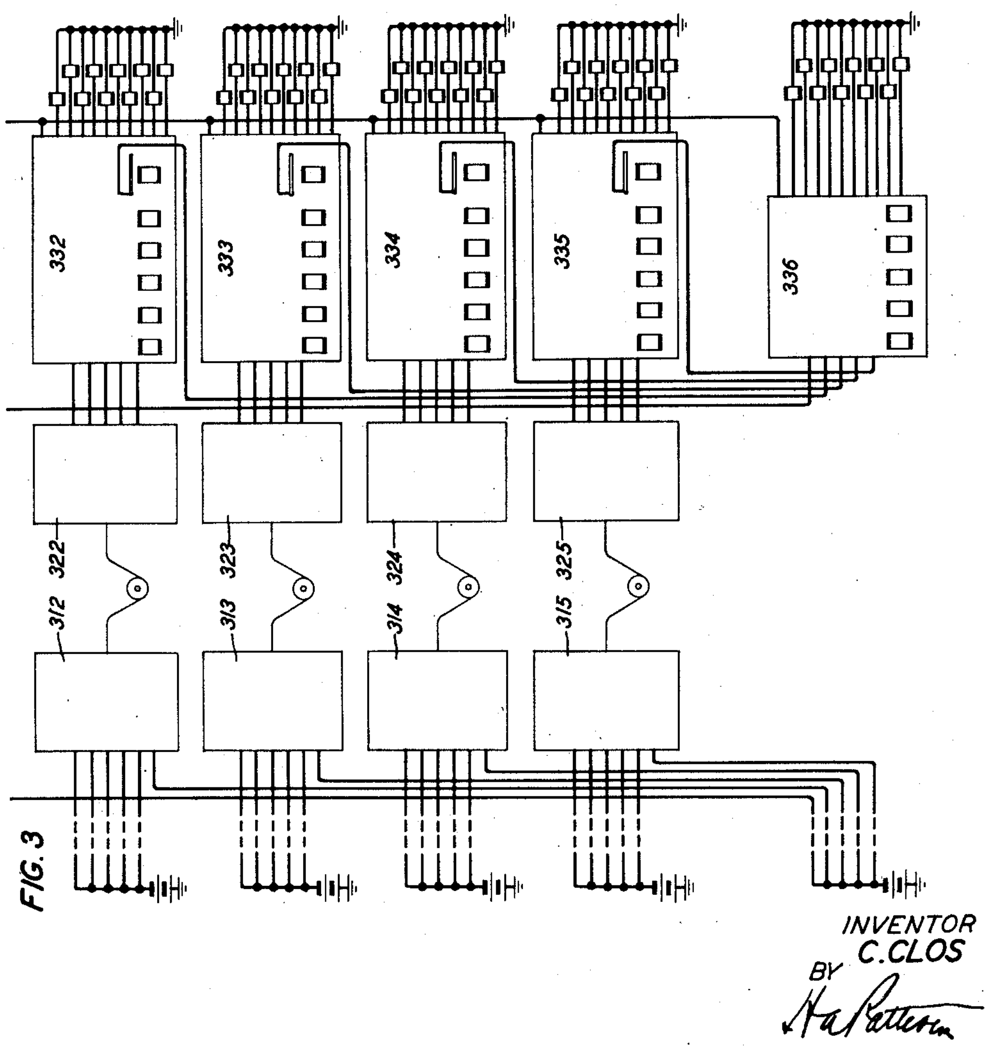
Fig. 3 shows an extension to the system shown in Figs. 1 and 2.
Figures 4, 5:
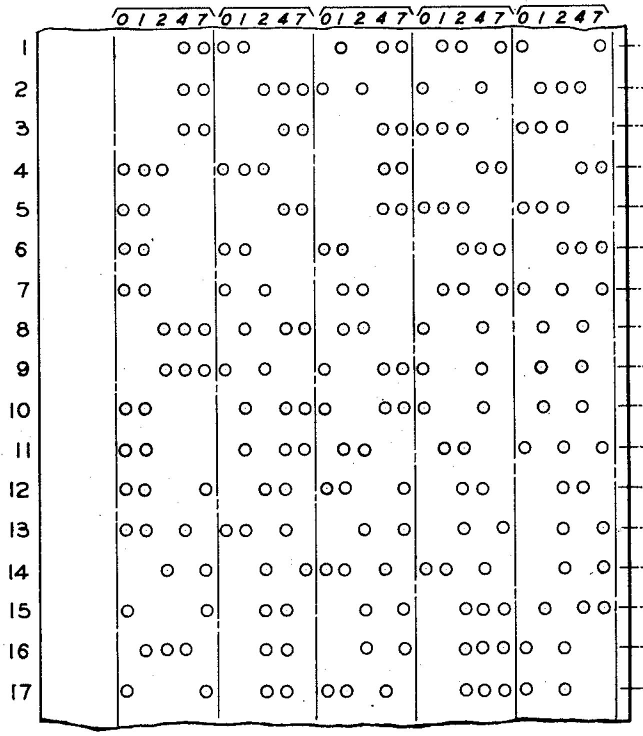
Figs. 4 and 5 show exemplary examples of suitable types of tape and the information recorded on the tape.

This invention is shown in an exemplary arrangement in Figs. 1, 2, 3, 4, and 5 embodying to a wider tape the type employed in automatic telephone message accounting as set forth in the above-described copending patent applications. A portion of such tape is illustrated in Fig. 5 wherein 28 perforations or emboss marks are or may be recorded in each transverse row or pattern across the tape. These recording positions across the tape are divided into five groups, each group comprising five perforation positions or areas which is employed to record the magnitude of one of five digits. The three remaining perforations may be employed for recording other information.

Figure 6:
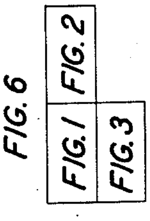

In accordance with the present invention the particular code employed in each one of these five groups may be controlled by additional information and since there are five such groups this additional information in all of them may represent the magnitude of an additional or sixth digit. Such an arrangement is shown in Fig. 3 of the drawing when it is positioned below Fig. 1 as illustrated in Fig. 6. Each one of the rectangles 312, 313, 314 and 315 represents control equipment comprising relays similar to 7 and 21 through 25. Rectangles 322, 323, 324 and 325 represent tape reading equipment similar to the equipment shown within the dot and dash line 101. The tapes between these devices are illustrated as being separate tapes in Fig. 3. It is to be understood of course, that the showing in Fig. 3 is merely representative and that these tapes may be one tape as shown in Fig. 5 or they may actually be separate tapes if it is so desired. In case a single tape is used the recording and reading devices represented in Figs. 1, 2 and 3 will all be located closely adjacent one another as shown in the above-identified patents. The rectangles 332 through 335 represent equipment similar to that of Fig. 2 within the dot-dash line 201 and thus provide suitable equipment for operating a signal response device as shown to the right of these rectangles. As all of these rectangles include a relay similar to relay 216 which is controlled by the recording in the tape or tapes in response to the application of battery to the additional or sixth lead at the recording positions. The output of the relays corresponding with relay 216 extends to rectangle 336 where they operate relays corresponding to relays 211, 212, 213, 214 and 215. These relays indicated within rectangle 336 are employed to decode and operate signal responsive devices shown to the right of rectangle 336 in a manner similar to that described above. In addition, a circuit extends to the alarm circuit 218 in case an improper number of the leads 6 at the recording station have had battery connected to them or in case the equipment fails to operate satisfactorily.

The above-described method of storing information and mode of operation of the exemplary embodiment of this invention is further illustrated in Fig. 4 which shows a table illustrating the method of recording various symbols in the tape and the perforations recorded in the tape representing various symbols.

The first line across Fig. 4 shows in the first five spaces the five different symbol representing areas in the tape and designates these areas by numerals which increase the facility with which the perforations in the tape may be read or interpreted. The last column indicates the additional symbols recorded in the tape in accordance with this invention as explained herein. The second row of Fig. 4, that is, the first line of figures in the second row of squares of Fig. 4, represents the codes employed to record the symbols in the respective columns or areas in the tape. Thus, in the first square from the left a symbol is recorded by a two-out-of-five code. In the next area the symbol is again recorded by a two-out-of-five code. In the next two areas the symbol is recorded by a three-out-of-five code while in the last area the symbol is represented by a two-out-of-five code.

It has been assumed for purpose of illustration that the numerals recorded in each of these areas are the same as the designations of the various areas in the first row of Fig. 4. Thus, in the first area on the left the zero is represented by a two-out-of-five code in which the number 4 and number 7 positions are perforated, embossed or punched. In the next area the numeral 1 is represented by a two-out-of-five code in which the number 0 and number 1 positions are punched. In the next area the figure 2 is represented by a three-out-of-five code in which the tape is perforated in the number 1, number 4 and number 7 positions. In the next area the numeral 4 is recorded in the tape by a three-out-of-five code by perforating the 1, 2 and 7 positions. Finally, in the last symbol recording area of the tape a 7 is recorded by means of a two-out-of-five code wherein the number 0 and number 7 positions are perforated in the tape. Under these circumstances, a three-out-of-five code is used to record information in the third and fourth squares which squares are located in the columns designated 2 and 4 with the result that the symbol 6 is recorded in the set of punches assumed in the first line of punches represented in Fig. 4 in addition to the other five symbols represented by the perforations in the first row across the tape represented in Fig. 4.

The third or lower row of squares illustrates the same symbols 0 through 7 recorded in the respective areas of the tape but in this case a two-out-of-five code is used in the first area or square, a three-out-of-five code is employed in the next column or square, a two-out-of-five code in the next two columns or squares and a three-out-of-five code in the last column or square with the result that an 8 is recorded as the extra symbol in the tape. The last line across the tape shows the particular positions perforated in each of the areas or squares of the last row of squares of Fig. 4. Thus, in the first square a 0 is perforated in the tape by means of a two-out-of-five code in which the number 4 and number 7 positions are perforated. In the next square, number 1 is recorded in the tape by means of a three-out-of-five code in which the number 2, number 4 and number 7 positions are perforated. In the third position a number 2 is recorded by means of a two-out-of-five code in which the zero and number 2 positions are perforated. In the next position a 4 is recorded in the tape by means of a two-out-of-five code in which the tape is perforated in the number 0 and number 4 positions. In the final area for recording symbols a 7 is recorded in the tape by means of a three-out-of-five code by perforating the tape in the number 1, number 2 and number 4 positions. With the tape thus perforated in the last line shown in Fig. 4 with a three-out-of-five code perforated in the column designated 1 and the three-out-of-five code perforated in the column designated 7, the symbol 8 is represented by the perforations in this row across the tape. It is thus apparent that in each row of perforations across the tape, when perforated as shown in Fig. 4, the symbols 0, 1, 2, 4 and 7 are recorded in it and in addition the first row of perforations has recorded in it an additional symbol 6 while the next row of perforations has the additional symbol 8 recorded in it. It is obvious that any one of the numerals 0 through 9 can be recorded in any one of the areas assigned to any one of the columns and that any one of the symbols 0 through 9 may likewise additionally be stored in each of the rows across the tape.

Fig. 5 represents a portion of a wide tape provided with five columns each of which is normally employed to represent or record one of the numerals 1 to 0 and in which an additional numeral is recorded in each row across the tape in accordance with this invention.

The first two rows across the tape have the symbols recorded in them in accordance with the two rows shown in Fig. 4 and described above. In the first row across the tape the numbers 0, 1, 2, 4 and 7 are stored in the respective columns as shown to the right of the tape in the first line and in addition the supplementary digit 6 is recorded in this same line in accordance with the present invention. In the first column, the digit 0 is recorded by perforations, punches or embossed marks in positions 4 and 7. In the second column from the left, the numeral 1 is recorded by punches in the 0 and number 1 positions. In the fifth column the number 7 is recorded by a punch in the 0 and number 7 positions. Since the supplementary digit recorded in this first row is a 6 the 2 recorded in the number 2 or third column is recorded by means of three perforations in the number 1, 4 and 7 positions and the 4 is recorded in the fourth or number 4 column by three perforations in the 1, 2 and 7 positions. Since three perforations are recorded in the third and fourth, i. e., number 2 and number 4 columns, the supplementary digit recorded is a 6.

In the second line the same numerals 0, 1, 2, 4 and 7 are recorded in the individual columns of the tape but the supplementary digit 8 is recorded by causing three perforations of punches in the second and fifth, i. e., the number 1 and number 7 positions or columns of the tape. Thus, the 0 is recorded in the first or left-hand column by perforations in the number 4 and number 7 positions. The 2 is recorded in the number 2 or third column by perforations in the 0 and 2 positions on the tape. The 4 is recorded in the number 4 or fourth column by perforations in the 0 and 4 positions. Since an 8 is the supplementary digit recorded in the second row across the tape the numerals 1 and 7 of the number will be represented by three perforations in the number 1 or second column and three perforations in the number 7 or fifth column. Thus, in the number 1 or second column the 1 is represented by perforations in the second, fourth and seventh positions and the 7 is represented in the number 7 or fifth column by perforations in the number 1, 2 and 4 positions.

In the third row the number 00000 is recorded in respective five columns and a 0 is recorded as the additional numeral in this row of the tape. The 0 is represented by perforations in the number 4 and number 7 positions. Consequently, three perforations or punches are employed in columns number 4 and number 7, i. e., the fourth and fifth columns of the tape, to represent the 0 in the supplementary position. Thus, the tape is perforated in the 4 and 7 positions in the 0, 1 and 2 columns of the tape and the 0 is represented in the number 4 and number 7 positions in the tape by perforations in the 0, 1 and 2 positions.

The fourth row illustrates the perforations required to represent the number 00000 together with the auxiliary or supplementary numeral 1. Since 1 is represented by punches in the 0 and 1 positions the number 1 and number 0 columns will have the 0 stored therein by means of three punches, namely, in the number 0, number 1 and number 2 positions. The zero is recorded in the remaining three columns by punches in the number 4 and number 7 positions on the tape.

Likewise, each of the other numbers shown to the right of the tape is recorded in the tape as illustrated in Fig. 5 and in addition the supplementary digits shown in the extreme right-hand column are also stored or recorded in the tape by the selection of the columns in which three perforations are employed to represent the numerals recorded therein instead of two perforations. Thus, the perforations shown in the other rows in the tape in Fig. 5 represent the numerals of the numbers shown to the right of each of the rows.

From an inspection of Figs. 4 and 5 it is evident that an additional digit is superimposed upon the digits or places of the numeral recorded in each row across the column. Any one of the numerals 0 to 9 may be recorded in each one of the five columns as heretofore and in addition an additional one of the numerals 0 to 9, such as shown in the extreme right-hand column of Fig. 5, may also be recorded in each of the rows across the tape in addition to the other five digits recorded in these rows.

It is thus apparent that in the case of the wide tape such as shown in Fig. 5 the magnitude of six digits of a decimal number system may be recorded in accordance with the present invention in a given space or area of tape and with the same number of recording elements or recording areas or positions as was required to record the magnitude of five digits of the decimal system in accordance with the prior art.

What is claimed is:

1. Apparatus for recording any selected numeral in each of a plurality of denominational orders of a number comprising apparatus for recording one of two different conditions in a selected two out of five different positions in a recording medium or in a selected three out of said five positions to represent the selected numeral of each denominational order, and means for recording an additional selected numeral in the same area of said medium as employed for recording the numerals of said plurality of denominational orders comprising apparatus for selectively recording certain of said numerals in said plurality of denominational orders by said one condition in three out of five positions in said medium and each of the other of said numerals by said one condition in two out of five positions in said medium.

2. Apparatus for recording any selected numeral in each of a plurality of denominational orders of a number comprising apparatus for punching a recording tape in a selected two out of five different positions in said recording tape or in a selected three out of said five positions to represent the selected numeral of each denominational order, means for recording an additional selected numeral in the same area in said tape as employed for recording the numerals of said plurality of denominational orders comprising apparatus for selectively punching said tape in three out of five positions to represent certain of said numerals in a plurality of denominational orders and punching said tape in two out of five positions to represent each of the other of said numerals.

CHARLES CLOS.

REFERENCES CITED

The following references are of record in the file of this patent:

UNITED STATES PATENTS

| Number | Name | Date |
|---|---|---|
| Re. 21,133 | Lake | June 27, 1939 |
| 1,876,294 | Hofgaard | Sept. 6, 1932 |
| 1,921,407 | Griffith | Aug. 8, 1933 |
| 1,933,943 | Griffith | Jan. 22, 1935 |
| 2,000,233 | Kirkegaard | May 7, 1935 |
| 2,016,705 | Bryce | Oct. 8, 1935 |
| 2,084,052 | Walker | June 15, 1937 |
| 2,268,499 | Bryce | Dec. 30, 1941 |
| 2,275,396 | Johnson | Mar. 3, 1942 |
| 2,302,033 | Johnson | Nov. 17, 1942 |
| 2,302,081 | Weitmann | Nov. 17, 1942 |